US012202248B2

(12) United States Patent
Klages et al.

(10) Patent No.: US 12,202,248 B2
(45) Date of Patent: Jan. 21, 2025

(54) TECHNIQUE FOR ARRANGING A MARKING AROUND A PROLATE OBJECT

(71) Applicant: Phoenix Contact GmbH & Co. KG, Blomberg (DE)

(72) Inventors: Kilian Klages, Detmold (DE); Bianca Hanselle, Paderborn (DE); Benjamin Pradel, Lage (DE)

(73) Assignee: PHOENIX CONTACT GMBH & CO. KG, Blomberg (DE)

(*) Notice: Subject to any disclaimer, the term of this patent is extended or adjusted under 35 U.S.C. 154(b) by 359 days.

(21) Appl. No.: 17/765,003

(22) PCT Filed: Oct. 6, 2020

(86) PCT No.: PCT/EP2020/077979
§ 371 (c)(1),
(2) Date: Nov. 15, 2022

(87) PCT Pub. No.: WO2021/069429
PCT Pub. Date: Apr. 15, 2021

(65) Prior Publication Data

US 2023/0241882 A1 Aug. 3, 2023

(30) Foreign Application Priority Data

Oct. 9, 2019 (BE) .................................. 2019/5667

(51) Int. Cl.

| | |
|---|---|
| ***B41J 3/407*** | (2006.01) |
| ***B41F 19/02*** | (2006.01) |
| ***B41J 3/44*** | (2006.01) |
| ***B65C 3/02*** | (2006.01) |

(Continued)

(52) U.S. Cl.
CPC ............. *B41F 19/02* (2013.01); *B41J 3/4075* (2013.01); *B41J 3/44* (2013.01); *B65C 11/02* (2013.01); *B65C 3/02* (2013.01); *H01B 13/344* (2013.01)

(58) Field of Classification Search
CPC ........................................................ B65C 3/02
See application file for complete search history.

(56) References Cited

U.S. PATENT DOCUMENTS

| | | | |
|---|---|---|---|
| 5,444,466 | A | 8/1995 | Smyczek et al. |
| 2003/0146943 | A1 | 8/2003 | Lehmkuhl et al. |

(Continued)

FOREIGN PATENT DOCUMENTS

| | | | | |
|---|---|---|---|---|
| CN | 104608974 | A * | 5/2015 | ............... B65C 3/02 |
| CN | 106275669 | A | 1/2017 | |

*Primary Examiner* — Joshua D Zimmerman
(74) *Attorney, Agent, or Firm* — LEYDIG, VOIT & MAYER, LTD.

(57) ABSTRACT

A device for arranging a marking around a prolate object includes: a material interface for receiving a printed product provided by a printer; a printing signal interface for acquiring a control signal indicative of the provision of the printed product; a stop for limiting a longitudinal motion of the prolate object along a longitudinal axis in an end position of the prolate object relative to the device; and at least one actuator for, depending on the control signal indicative of the provision of the printed product, arranging the marking in a circumferentially closed manner on the prolate object using the printed product provided by the printer. The prolate object is arranged in the end position.

19 Claims, 9 Drawing Sheets

(51) Int. Cl.
*B65C 11/02* (2006.01)
*H01B 13/34* (2006.01)

(56) References Cited

U.S. PATENT DOCUMENTS

| | | | |
|---|---|---|---|
| 2004/0211522 | A1 | 10/2004 | Fries et al. |
| 2008/0073023 | A1 | 3/2008 | Fries et al. |

* cited by examiner

200

TECHNIQUE FOR ARRANGING A MARKING AROUND A PROLATE OBJECT

CROSS-REFERENCE TO PRIOR APPLICATIONS

This application is a U.S. National Phase application under 35 U.S.C. § 371 of International Application No. PCT/EP2020/077979, filed on Oct. 6, 2020, and claims benefit to Belgian Patent Application No. BE 2019/5667, filed on Oct. 9, 2019. The International Application was published in German on Apr. 15, 2021 as WO/2021/069429 under PCT Article 21(2).

FIELD

The invention relates to a technique for marking a prolate object, for example a conductor. In particular, the invention relates to a device for arranging a marking circumferentially closed around a prolate object.

BACKGROUND

For example, conventional label printers are used for marking electrical conductors (or wires), wherein the conventional label printers print a label and the printed label then has to be manual mounted on the conductor after printing. The document US 2003/146943 A1 describes a printer that alternately prints and cuts a label.

Furthermore, special printers are known which may be used for conductor labeling. The document US 2004/0211522 A1 describes a machine that takes, from a spindle roll, a pre-printed wrap-around label and winds the wrap-around label around a conductor. The document US 2008/0073023 A1 describes a monolithic machine for printing and applying wrap-around labels.

A disadvantage of such conventional devices is that they can print only certain labels and, if an automated application is integrated, no other printing applications are possible with it. Another disadvantage is that when labels are applied manually and different printing systems are used for different printing applications, the position of the label on the conductor is inconsistent.

The document U.S. Pat. No. 5,444,466 A describes a printing system for inscribing directly on a longitudinally movable conductor in synchronization with the feed of the conductor including a stop of the motion. Due to the direct inscribing, a contrast can be low compared to printed labels, and even when using such printing equipment, a position of the label on the conductors may be inconsistent, as different printing equipment is necessary for different printing applications.

SUMMARY

In an embodiment, the present invention provides a device for arranging a marking around a prolate object, comprising: a material interface configured to receive a printed product provided by a printer; a printing signal interface configured to acquire a control signal indicative of the provision of the printed product; a stop configured to limit a longitudinal motion of the prolate object along a longitudinal axis in an end position of the prolate object relative to the device; and at least one actuator configured to, depending on the control signal indicative of the provision of the printed product, arrange the marking in a circumferentially closed manner on the prolate object using the printed product provided by the printer, wherein the prolate object is arranged in the end position.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
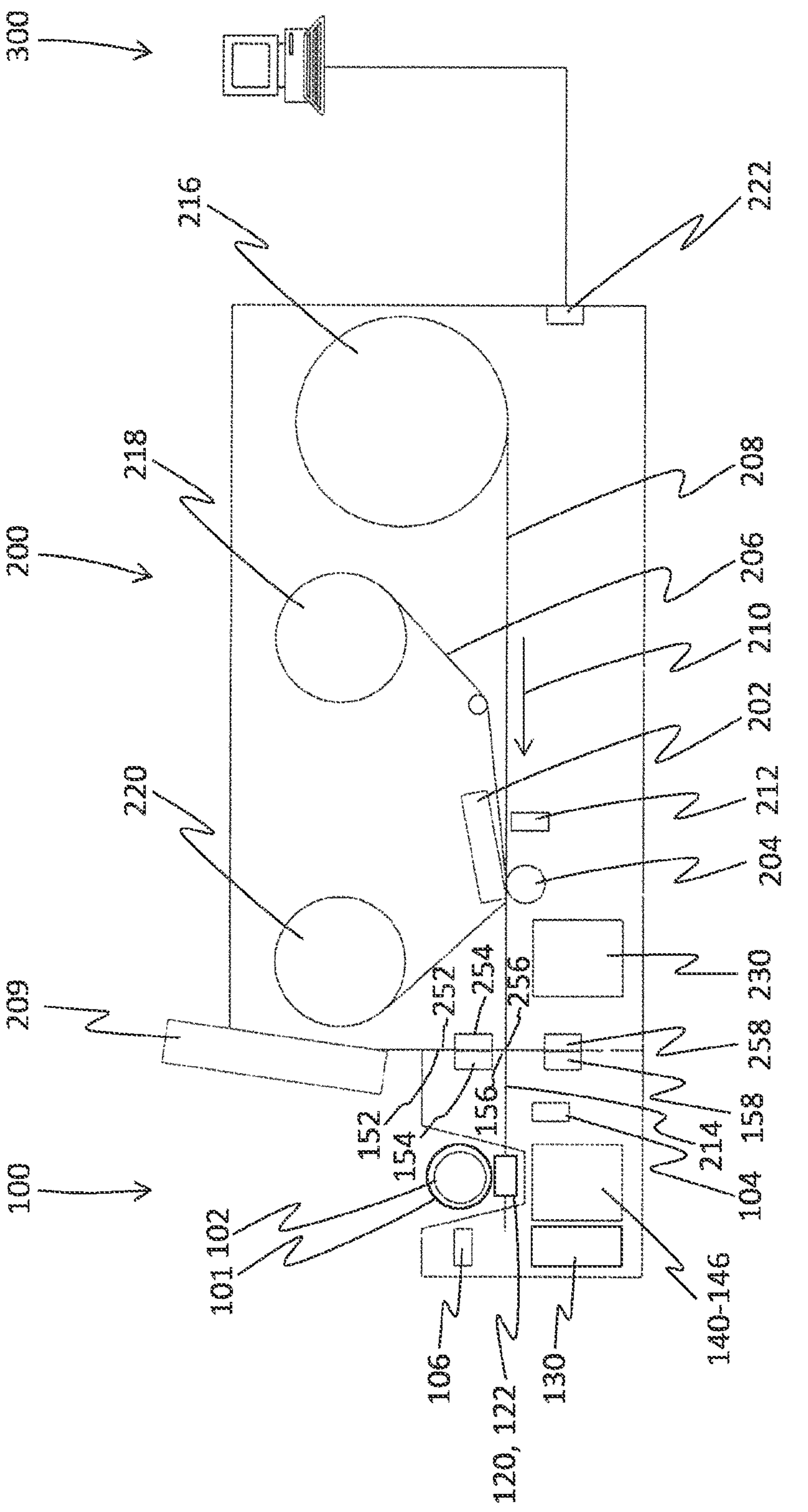
FIG. 1 a schematic sectional view of a first embodiment of a device for arranging a marking attached to an embodiment of a printer.

In an embodiment, the present invention provides a device for a printing system, preferably with the size and portability of a tabletop device, so that the system can be converted in short time to different applications of object marking, preferably different applications of conductor marking. An embodiment provides to quickly and easily convert a printing system originating from a normal or application-unspecific label printer, so that the device performs the application (or arranging) of the marking at a defined position on the prolate object, preferably on the conductor.

One aspect relates to a device for arranging a marking around a prolate object, preferably around a conductor. The device comprises a material interface configured to receive a printed product provided (or output) by a printer; a printing signal interface configured to acquire a control signal as to the providing (or output) of the printed product; a stop for limiting a longitudinal motion of the prolate object along a longitudinal axis in an end position of the prolate object relative to the device, preferably relative to a location of the arrangement of the marking; and at least one actuator configured to arrange the marking in a circumferentially closed manner on the prolate object using the printed product provided (or output) by the printer in dependence on the control signal as to the providing (or outputting) of the printed product, wherein the prolate object is arranged in the end position.

By the stop limiting the longitudinal motion of the object along the longitudinal axis in the end position relative to the device, embodiments may arrange the marking at a position on the object defined by the stop. Preferably, the position of the stop is adjustable (for example, manually or electromotively adjustable), whereby the stop determines an adjustable distance between the marking (for example, label) and an end of the object (for example, ladder end).

The longitudinal axis may correspond to the longitudinal axis of the prolate object, for example, a line direction of the conductor at the location of arranging the marking.

The longitudinal motion of the prolate object may be a motion (or a component of a motion) along a longitudinal axis of the prolate object. Accordingly, longitudinally movable of the prolate object may be realized by a degree of freedom of motion along the longitudinal axis of the prolate object. A definition of the longitudinal axis may refer to a portion (preferably an end portion) of the prolate object relevant to the marking or a location of arranging the marking.

The device may be configured to insert the object. The stop may be configured to limit longitudinal motion of the object during insertion.

The prolate object may abut the stop to determine the end position along the longitudinal axis.

The end of the prolate object may abut the stop (preferably the stop surface) for limiting longitudinal motion, in the end position, for determining the end position along the longitudinal axis, prior to arranging the marking, and/or during arranging the marking.

The end may be an end face of the prolate object along the longitudinal axis. The end may be a free end of the conductor.

Adjustability of the position of the stop may define the direction of the longitudinal axis. The longitudinal axis may be parallel to the motion of the stop.

The stop may be adjustably positioned along the longitudinal axis. The adjustable position of the stop may determine a distance between an end of the object abutting the stop (preferably the stop surface) and the marking arranged on the object (preferably the location of the arrangement of the marking).

Preferably, the location of the marking relative to the device is independent of the adjustable position of the stop.

The device may further comprise a rotatably mounted threaded rod or spindle, preferably parallel to the longitudinal axis. An axis of rotation of the threaded rod or spindle may be parallel to the longitudinal axis.

The position of the stop may be manually adjustable using a threaded rod parallel to the longitudinal axis. Alternatively or additionally, the position of the stop may be adjustable using a spindle parallel to the longitudinal axis. The spindle may be in driving connection with the at least one actuator or a further actuator of the device. Preferably, the further actuator can be controlled by the printer (for example, by its control unit or regulating unit) via a data interface.

The stop may comprise a through opening with internal thread (preferably a trapezoidal thread). The threaded rod or spindle may be arranged in the through hole. An external thread (preferably a trapezoidal thread) of the threaded rod or spindle may cooperate with the internal thread of the stop to transmit a translational force along the longitudinal axis upon (for example, manual or electric motor-driven) rotation of the threaded rod or spindle.

The printer may indicate at a user interface adjustability of the stop and/or receive input of a position or a change in position. Alternatively or additionally, the printer may acquire print data (for example, of a print job), for example at an interface of the printer, from a local computer, a local storage medium, a server, or a mobile device. The print data may indicate a position of the stop or a distance between the stop and the location of the arrangement of the marking.

The data interface may be configured to control, regulate, synchronize, and/or coordinate an alternating and/or event-driven operation of, on the one hand, the at least one actuator and/or the further actuator and, on the other hand, the printer for arranging the marking.

The material interface may be configured to receive the printed product provided (or output) by the printer in a longitudinal direction. The longitudinal axis may be parallel or perpendicular to the longitudinal direction of the printed product.

Arranging the marking may comprise wrapping the (preferably cut) printed product around the prolate object. Preferably, the longitudinal axis is perpendicular to the longitudinal direction of the printed product. Alternatively, arranging the marking may comprise sliding or putting on the (preferably cut and/or opened) printed product (for example, a printed tube) onto the prolate object. Preferably, the longitudinal axis is parallel to the longitudinal direction of the printed product.

The stop may be mounted for pivotal motion about a pivot axis, for example between a first pivot position and a second pivot position (different from the first pivot position). In the first pivot position, the stop may be arranged to limit the longitudinal motion of the prolate object along the longitudinal axis. In the second pivot position, the stop may be arranged outside the longitudinal axis.

The pivot axis may be in drive connection with the at least one actuator or another actuator of the device.

The pivot axis may be parallel and/or spaced from the longitudinal axis. The pivot axis and the axis of rotation may be coaxial or aligned. The pivot axis may be equal to the axis of rotation.

The device may comprise a control unit or regulating unit configured to control or regulate the at least one actuator of the device for arranging the marking, and/or to control or regulate the further actuator for rotating the spindle and/or for pivoting the stop.

The stop may be in the first pivot position before arranging the marking. During arranging, the stop may be in the second pivot position.

The device may further comprise at least one object holder. The object holder may be configured to receive and/or support the object longitudinally movable along the longitudinal axis relative to the device, preferably relative to the location where the marking is arranged.

The at least one object holder may define the end position transverse to the longitudinal axis (for example, of the longitudinal motion and/or the prolate object).

The end position of the object may be determined transversely to the longitudinal axis by the object abutting downward (i.e., in the direction of gravity) and/or laterally (i.e., transverse to the longitudinal direction and transverse to the direction of gravity) against the object support. Upwardly (i.e., opposite the direction of gravity), the end position of the object may be fixed by the gravity of the object.

The at least one actuator may comprise a cutting unit configured to cut through the printed product in a transverse direction transverse (preferably perpendicular) to the longitudinal direction of the printed product. The longitudinal axis of the longitudinal motion and/or of the prolate object defined by the at least one object holder may be parallel or substantially parallel to the transverse direction.

The at least one object holder may comprise one object holder along the longitudinal axis on each side of the location of arranging the marking. In other words, the at least one object holder may comprise one object holder along the longitudinal axis on each side of the location of arranging the marking.

The two object holders on either side of the location of arranging may define the longitudinal axis (preferably of the object, for example in the end position, and/or longitudinal motion).

The at least one actuator may be configured to arrange the marking on the object defined by the at least one object holder.

One of the object holders may be arranged along the longitudinal axis between the stop and the location of the marking.

The stop may comprise an object holder of the at least one object holder. Alternatively or additionally, an object holder of the at least one object holder may be rigidly connected to the stop. For example, the stop may comprise a recess, preferably a blind hole, for plugged reception of the end of the object along its longitudinal axis (for example, in the direction of longitudinal motion).

The or each of the at least one object holder may comprise an upwardly open fork. The or each of the at least one object holder may comprise a fork having two upwardly diverging fork arms for receiving the object between the fork arms. In this regard, the longitudinal axis of the object may be transverse, preferably perpendicular, to a plane spanned by the fork arms.

The stop and/or the at least one object holder may comprise at least one sensor configured to receive (or detect) a control signal as to the providing (preferably the arranging) of the marking. The control signal for providing (preferably arranging) the marking may initiate (i.e., trigger) the arranging of the marking. For example, the sensor detects the presence of an inserted object.

Preferably, the at least one actuator is further configured to arrange the marking on the object in a circumferentially closed manner depending on the control signal as to providing (or outputting) the printed product and the control signal for providing (preferably arranging) the marking using the printed product provided (or output) by the printer, wherein (for example while) the prolate object is arranged in the end position.

The device may be a device for providing a marking arranged or arrangeable in a closed circumferential manner around a prolate object, preferably around a conductor.

Alternatively or additionally, the device comprises at least one actuator which is configured to arrange the marking on the object in a circumferentially closed manner or to provide it for circumferentially closed arrangement, depending on the control signal as to providing (or outputting) the printed product and the control signal for providing (preferably for arranging) the marking using the printed product provided (or output) by the printer.

The device may be a device for circumferentially arranging a printed marking around a prolate object, preferably around a conductor.

The device may be configured as an applicator, annex (or stem) or attachment of the printer, in particular of a thermal transfer printer. The device may be interchangeable. Each of a plurality of different embodiments of the devices may be selectively attachable to the same printer.

The printer may receive an identifier via an interface (e.g., a network interface or a serial interface). The printer may be configured to print the received identifier onto a print medium using a printing material. The printing material may comprise a color ribbon, for example for thermal transfer printing. The print medium (i.e., a print-on substrate or printing material) may be a plastic film, for example for heat sealing or welding, or a heat shrink tube. The printed product may comprise the print medium printed using the printing material.

The providing may comprise arranging the marking on the prolate object, preferably arranging the marking circumferentially about a longitudinal axis of the prolate object. The at least one actuator may be configured to circumferentially arrange the printed marking about a longitudinal axis of the object.

For example, the actuator may arrange or provide the marking when the control signal of the printing signal interface indicates the provisioning (or output) of the printed product at the material interface and the control signal of the sensor indicates the presence of the object or a requested use to provide the marking.

The device and the printer may be arranged next to each other or side by side, for example without a direct mechanical connection. For example, the printer and device may each be arranged in a stationary and/or non-slip manner on the same work surface. For example, a material interface of the printer may be aligned or overlapping (or congruent) with or covered by the material interface of the device. There may be a clear gap between the printer and the device during operation.

The device may further comprise a mechanical interface configured to releasably or irreversibly attach (or mount or fasten) the device to the printer.

The attachment (or mounting or fastening) may be irreversible, for example comprising a material connection (i.e., may be materially bonded). Alternatively, the device may be removably attached to the printer, such as being non-destructively detachable and/or attachable and/or detachable without tools.

The at least one sensor of the control signal for providing the marking may be configured to sense (e.g., acquire) or detect the object, preferably to detect a presence, a location, and/or a size of the object.

The control signal for providing the marking may indicate the presence (i.e., the presence), the location, and/or the size of the object. The location may comprise a position and/or orientation of the object (for example, a longitudinal axis of the object). The size may comprise a length (for example, along the longitudinal axis), a width, a diameter, and/or a circumference of the object.

The at least one sensor of the control signal for providing the marking may acquire (or detect) the object without contact.

The at least one sensor of the control signal for providing the marking may comprise a pushbutton. The control signal for providing the marking (also: control signal for the provision of the marking or marking provision control signal) may indicate an actuation of the button (also: provision request).

The control signal for providing the marking may indicate a user request for providing the marking. The control signal for providing the marking may be a trigger signal. The actuator may be configured to arrange the marking on the object in a circumferentially closed (or closed-loop) manner or to provide the marking for circumferentially closed arrangement in response to the detection of the object and/or the acquiring of the trigger signal.

The button may be a foot switch or a hand switch.

The printing signal interface may comprise a sensor configured to detect the printed product provided (or output) by the printer, preferably to detect a presence, a position, and/or a feed of the provided (or output) printed product.

The sensor for detecting the provision (or output) of the printed product (also: sensor for detecting the provided printed product or in short: sensor for detecting the printed product) may be arranged at the material interface. The printed product detection sensor may detect the printed product without contact (i.e., contactless).

The at least one sensor may further comprise a sensor for detecting the printed product provided (or output) from the printer. Detecting the printed product may comprise detecting the presence, a location (e.g., position and/or orientation), and/or a size (e.g., length and/or diameter) of the printed product.

Alternatively or additionally, the printing signal interface may comprise a data interface configured to communicate, preferably bidirectionally, with the printer for providing or arranging the marking.

The at least one actuator may be configured to (for example, in response to detecting the object and/or acquiring the trigger signal) process, in communication with the printer, the printed product provided (or output) from the printer for marking and to arrange, or provide for arrangement of, the marking on the object.

The bidirectional communication may comprise receiving the control signal as to providing (or outputting) the printed product from the printer and sending a control signal for requesting the provision (or output) of the printed product to the printer. For example, the control signal indicative of the providing of the marking may be forwarded to the printer via the data interface as a request indicative of the provision (or output) of the printed product.

The printer may be configured to deliver the printed product to the device at the material interface, for example, in accordance with the bidirectional communication and/or in response to the control signal to provide the marking.

The data interface may be configured for wireless communication, preferably using radio signals, infrared signals, and/or near-field communication.

The data interface may be configured to synchronize or coordinate an alternating and/or event-driven operation of the at least one actuator and the printer to provide or arrange the marking.

For example, a feed (e.g., feed forward) of the printed product performed by the printer may be alternately performed, synchronized, and/or coordinated with a cutting, folding, and/or wrapping of the provided (or output) printed product. The respective sub-steps executed during alternating and/or event-driven operation by the device or the printer for the providing or the arranging of the marking may also be referred to as actions. The coordination of the sub-steps may also be referred to as action coordination.

The data interface may be configured to enable the printer to control the at least one actuator of the device, to read control signals from the at least one sensor and/or the printing signal interface of the device, and/or to read an identifier stored in the device.

The at least one actuator of the device may be controllable on the printer side using the data interface. Alternatively or additionally, measured values of the at least one sensor of the device may be queried (e.g., retrieved or requested) using the data interface.

The data interface may be electrically connected within the device to the at least one actuator and/or the at least one sensor.

The data interface may be configured to receive control commands for controlling or regulating the at least one actuator from the printer and/or to send control commands for controlling or regulating the printer to the printer based on the control signals from the at least one sensor and/or the printing signal interface.

The data interface may be electrically connected to the at least one actuator and/or the at least one sensor within the device via a control unit and/or a regulating unit. The control unit and/or regulating unit may determine parameters of the applicator from the acquired (or detected) measured values. The control commands sent to the printer may comprise the parameters and/or control the printer according to the parameters.

The data interface may be configured to send control signals (for example, control commands and/or confirmation messages) from the at least one sensor and/or the printing signal interface, and/or parameters determined from the (aforementioned) control signals, to the printer for the providing or the arranging of the marking.

The device may further comprise a control unit or regulating unit configured to control or regulate the at least one actuator of the device depending on the control signals of the at least one sensor, measured values of the printer received via the data interface, confirmation messages of the printer received via the data interface, and/or control commands of the printer received via the data interface for arranging or providing the marking.

The control unit or the regulating unit may be further configured to obtain (e.g., receive) a control command from the printer via the data interface, to execute control or regulation of the at least one actuator in accordance with the control command, and to send a feedback to the printer via the data interface in response to completion of execution of the control command.

The feedback may comprise a confirmation of the (for example successful) completion of the execution of the control command or an error message regarding an error during the execution of the control command. For example, the feedback may inform the printer that a defined state of the device has been reached, such as an end position of the at least one actuator.

The control unit or regulating unit may further be configured to determine a parameter of the arranging based on the control signal acquired (or detected) using the at least one sensor, and to send the determined parameter to the printer via the data interface.

The acquired (or detected) control signal may be indicative of a diameter or circumference of the object. The determined parameter may be indicative of a length of a feed (e.g., an advance or feed forward) or a retraction of the printed product.

A control command sent from the device to the printer via the data interface may initiate the feed (e.g., advance or feed forward) or the retraction.

The control unit or regulating unit may autonomously perform the providing or arranging of the marking, or a substep of the providing or the arranging of the marking, in accordance with the control command during the time period between obtaining (e.g., receiving) the control command from the printer and sending the feedback to the printer.

The device may further comprise an electrical interface configured to supply electrical power to the device via the printer.

The data interface and/or the electrical interface may be arranged relative to the mechanical interface to contact the printer for communication or supply of electrical power when the device is attached to the printer using the mechanical interface.

The data interface may be arranged relative to the mechanical interface to contact the printer for communication when the device is attached to the printer by the mechanical interface. The electrical interface may be arranged relative to the mechanical interface to contact the printer for power supply when the device is attached to the printer using the mechanical interface. For example, attaching (or mounting or fastening) the device to the printer using the mechanical interface may cause contacts of the data interface and/or the electrical interface to become connected.

The object may comprise a conductor or may be a conductor. The conductor may be a conductor (or electrical wire) or a light guide (or optical fiber).

The mechanical interface may comprise a centering pin or an opening for receiving a centering pin and/or a lever and an eccentric connected to the lever in a rotationally fixed manner, which eccentric is configured for attaching (or fastening) the device to the printer without screws and/or without tools.

Another aspect relates to a system (also: printing system) for arranging a marking around a prolates object, preferably around a conductor. The system may be a system for providing a marking arranged or arrangeable in a closed loop around a prolates object, preferably around a conductor. The system comprises a printer, preferably a thermal transfer printer, configured to provide (or output) a printed product. Further, the system comprises a device according to an embodiment of the device aspect (i.e., the aforementioned aspect), wherein the material interface may be arranged, relative to the printer, to receive the printed product provided (or output) by the printer.

Embodiments of the device enable a modular system (also: printing system) that may be based on a single printer, for example a desktop device, such that this printer may be converted in a short time or few steps to the different applications of object marking, preferably conductor marking. For example, a user can quickly and easily form a system from a normal or application-unspecific label printer for assisting in applying a marking (for example, a label) to the prolate object to be marked, preferably the conductor to be marked.

Herein, the terms application and applying (preferably as a process step) may be interpreted to be synonymous or interchangeable. The terms arrangement and arranging (preferably as a process step) may be interpreted herein to be synonymous or interchangeable.

Applying the marking on or to the prolate object (preferably on or to the conductor) may comprise arranging the marking on or at the prolate object. Providing the marking arranged or arrangeable in a circumferentially closed manner around the prolate object (preferably around the conductor) may comprise cutting (preferably trimming) the printed product.

The prolate object may be an elongated object. At least in sections, the prolate object may be a (for example, general) cylinder, preferably a circular cylinder or a prism.

The prolate object may have a longitudinal axis. An extent of the object in the direction of the longitudinal axis may be greater (for example, several times greater) than one or any extent of the object transverse or perpendicular to the longitudinal axis.

The prolate object may be a conductor, a tube, a vessel, or a housing. The conductor may be an elongated object for conducting signals or substances. For example, the conductor may be an elongated object for conducting electrical current and/or electromagnetic radiation (preferably light). The vessel may be a test tube or a sample tube, for example for holding and/or transporting a fluid.

The conductor may comprise one core or two, at least two, three or more cores (or wires) electrically insulated or optically decoupled from each other. The cores may be parallel to each other or may be twisted together (for example, in pairs).

The core or the conductor may be a single wire or a plurality of, fine and/or superfine stranded conductors.

The conductor may be a cable, cable bundle, and/or ribbon cable. The conductor may be a light guide (also: optical fiber or light guide cable). The conductor may be a tube and/or a fluid line or conduit.

The conductor may be a cylindrical body and/or a non-rotationally symmetric elongated body. The conduction of the signals or substances may be directed along a longitudinal axis of the conductor and/or may extend between ends of the conductor.

By allowing embodiments of the device for a specific application to be attached to a printer that is not specific to the application, special printers for the respective application, and thus costs, can be avoided and/or resources can be used more effectively. For example, a utilization rate of the printer may be increased as a result. The same or further embodiments of the device may reduce a downstream manual effort in mounting the printing materials on the objects to be marked.

FIG. 1 shows an embodiment of a device generally designated by reference numeral 100 for providing (for example, for output, arrangement and/or application or applying) a marking 101 arranged or arrangeable in a closed circumferential manner around a prolate object 102, preferably around a conductor.

The device 100 comprises a material interface 156 configured to receive a printed product 214 provided (or output) from a printer 200 (preferably in a longitudinal direction 210).

Further, the device 100 comprises a printing signal interface (for example, a sensor generally designated herein by reference numeral 104 and/or a data interface generally designated herein by reference numeral 158) configured to acquire (or detect) a control signal as to providing (or outputting) the printed product 214.

The device 100 comprises a stop 140 for limiting longitudinal motion of the prolate object 102 along a longitudinal axis (which may be, for example, perpendicular to the image plane of FIG. 1) in an end position of the prolate object 102 relative to the device 100, preferably relative to a location of arranging the marking 101.

Further, the device 100 comprises at least one actuator configured to arrange the marking 101 circumferentially closed on the prolate object 102 using the printed product 214 provided (or output) from the printer 200 in response to the control signal as to providing (or outputting) the printed product 214, wherein the prolate object (102) is arranged in the end position.

Preferably, the device 100 comprises at least one sensor 106 configured to acquire (or detect) a control signal for providing the marking 101. For example, the sensor 106 is integrated into the stop 140.

Further features for implementing the stop 140 are generally referred to herein by reference numerals 141 to 146, and may be implemented individually or collectively in any embodiment of the device 100. In particular, a stop surface of the stop 140 against which the object 102 may abut is outside the sectional plane shown in FIG. 1, and is therefore described below with reference to FIG. 2.

The at least one actuator (for example, at least one of the actuators generally designated herein by reference numerals 120, 122, and 144) may be configured to arrange the marking 101 on the object 102 in a closed circumferential manner and/or to position the stop 140 in response to the control signal as to providing (or outputting) the printed product 214 and the control signal for providing the marking 101 using the printed product 214 provided (or output) from the printer 200.

Optionally, the device 100 comprises a mechanical interface 152 configured to removably attach (or mount) the device 100 to a printer 200.

For example, the printing signal interface comprises a data interface 158 configured to communicate with the printer 200 for providing the printed marking 101. The control signal as to providing (or outputting) the printed product 214 may be received by the printer (for example, its control unit generally designated by reference numeral 230). Alternatively or additionally, the printing signal interface comprises a sensor 104 configured to acquire (or detect) the provided (or output) of the printed product 214.

For example, the sensor 106 of the device 100 is configured to detect the object 102, preferably the conductor 102, (for example, its presence and/or size, preferably width or diameter). Alternatively or additionally, the sensor 106 comprises a pushbutton whose actuation initiates the provisioning.

Through the material interface 156, the device 100 receives the printed product 214 provided (or output) by the printer 200. The at least one actuator (for example, at least one of the actuators generally designated herein by reference numerals 120 and 122) of the device 100 may be configured (preferably controlled) to provide (for example, arrange) the marking 101 by means of (i.e., using) the printed product 214 provided (or output) by the printer 200 in response to communication with the printer 200 (for example, via the data interface 158) and/or detection of the object 102 (preferably the conductor), for example, by means of the sensor 106.

For a concise description, and without limitation of the prolate object 102, a conductor is described below as an example of the prolate object 102.

Preferably, the device 100 further comprises an electrical interface 154 for supplying power to the device 100 via the printer 200. Alternatively or additionally, the device 100 may comprise its own power supply, such as a power supply for connection to a power grid or a rechargeable electrical energy storage device (such as a secondary cell).

Optionally, the device 100 comprises a control unit 130 or regulating unit 130 configured to control or regulate the at least one or each actuator (for example, the actuator 120 and/or 122) of the device 100, for example, according to a controlled variable whose actual value is detected by the sensor 106 as measured values. Alternatively or additionally, the control unit 130 or the regulating unit 130 may be configured to acquire (or detect) the measured values from the at least one sensor 104 and/or 106 and send them to the printer 200 via the data interface 158. Alternatively or additionally, the control unit 130 or the regulating unit 130 may be configured to receive control commands for controlling or regulating the at least one actuator (for example, the actuator 120 and/or 122) from the printer 200 via the data interface 158 and/or to send control commands for controlling or regulating the printer 200 to the printer 200 based on measured values of the at least one sensor 106.

The printed product 214 may be a printable medium 208 printed by the printer 200. The printable medium 208 may be a printable tape (preferably plastic tape or adhesive tape) or a printable film (preferably plastic film or adhesive film). The printable film may comprise a self-adhesive layer on a side opposite the printing, or may be weldable to itself (preferably at an end) and/or to the conductor by the application of heat. Alternatively or additionally, the print medium 208 may comprise a tube (for example, a heat shrink tube).

The first actuator 120 (also: cutting unit) may be configured to cut the printed product 214. The cutting unit may be configured to cut through the printed product 214 in a transverse direction 121 transverse, preferably perpendicular, to the longitudinal direction of the printed product 214. Alternatively or additionally, the second actuator 122 may be configured to provide the cut printed product 214, preferably to arrange it on the conductor.

The marking 101 may comprise a portion of the printed product 214, for example a portion of the printed product 214 cut by the device 100 by means of the at least one actuator (for example, 120 and/or 122). The marking 101 may also be referred to as a label.

The marking 101 may be a printed wrap-around label, a printed flag label, or a printed section of the tube.

The application of the marking 101 to the conductor 102 may comprise a material connection of the marking 101 to the conductor 102. For this purpose, the marking 101 may be self-adhesive or bondable by heat. For example, the marking 101 may be a flag label that is wrapped around the conductor 102 during application and connected to itself in a two-dimensional manner at both ends of the marking 101. In another example, the marking 101 may be a wraparound label that is wrapped around the conductor 102 and connected to itself over a surface (or in a two-dimensional manner) during application. Alternatively or additionally, applying the marking 101 to the conductor 102 may comprise a positive-fit connection (for example, movable in the longitudinal direction of the conductor) of the marking 101 to the conductor 102. For this purpose, the marking 101 may comprise a tube (for example, a shrink tube) and/or a film (for example, a weldable thermoplastic film) that can be bonded to itself at the ends (preferably by the action of heat).

Applying the marking 101 to the conductor 102 using the at least one actuator 120 or 122 may comprise opening the tube and/or sliding the tube (for example the shrink tube) as the marking 101 onto the conductor 102, wrapping the marking 101 around the conductor 102, wrapping the marking 101 around the conductor 102 and closing the marking 101 as a flag label, inserting the marking 101 into a transparent grommet on the conductor 102, and/or printing a tag as the marking 101 that may be clipped around the conductor 102.

The device 100 may be configured to apply the marking 101 to the conductor 102 when the conductor 102 is already mounted (for example, when ends of the conductor are contacted and/or not free ends). For example, the conductor 102 may: (a) not be rotated about a transverse axis transverse to a longitudinal axis of the conductor 102; (b) not be rotated about a longitudinal axis of the conductor 102; and/or (c) be at rest when applied and/or in the object holder.

The marking 101 applied to the conductor 102 may be captive. Alternatively or additionally, a printed surface of the applied marking 101 may be flat or substantially free of curvature. For example, the printed surface may be arranged between two embossments. As a result, the printed surface may be easily readable and/or sufficiently large.

The marking 101 may be durable, for example in terms of printing (preferably in that the printer 200 is a thermal transfer printer), in terms of the material of the print medium 208 (for example in that the print medium is a plastic film), and/or in terms of the connection to the conductor 102 (for example in that the marking 101 is positively or materially (e.g., firmly bonded or adhesively) connected to the conductor 102).

A marking 101 may be space-saving, for example, such that a plurality of conductors 102 each carrying such a marking 101 may be arranged closely together. Alternatively or additionally, the marking 101 may be displaceable (i.e., movable) and/or rotatable, for example by positively connecting the marking 101 to the conductor 102. This may allow the marking 101 to be aligned on conductors 102 (such as cables) that are in close proximity to each other.

The first embodiment of the device 100 shown in FIG. 1 is attached to an embodiment of the printer generally designated by reference numeral 200. While the embodiment of the printer 200 shown in FIG. 1 is shown and described in connection with the first embodiment of the device 100, the other embodiments of the device 100 may also be attachable (preferably alternately) to the embodiment of the printer 200.

The embodiment of the printer 200 comprises a print head 202, a print roller 204 (or platen roller), a light barrier 212 for detecting the print medium 208 (i.e., the material to be printed), for example, for detecting control holes, (for example, black) control marks, a beginning and/or an end of the print medium 208. The printing material 206 is, for example, a color ribbon.

The material 208 to be printed is guided, along with the color ribbon 206, between the print head 202 and the print roller 204. The light barrier 212 may detect a beginning of the print medium 208 during printing to ensure positioning of the printed image within the portion of the printed product 214 using which the marking 101 is formed.

The printer 200 comprises interfaces that are spatially associated with and/or functionally correspond to the interfaces of the device, respectively. The spatially associated and/or functionally corresponding interfaces are connected or connectable to each other in pairs.

Preferably, the printer 200 comprises a mechanical interface 252 that is connected to, or is connectable to, or in communication or exchange or configured for communication or exchange with the mechanical interface 152 of the device 100. Preferably, the spatial association implies that when the mechanical interface 152 and 252 are connected (e.g., interlocked), the other interfaces of the device 100 and the printer 200 are also mutually connected or brought into communication or exchange.

Alternatively or additionally, the printer 200 comprises a data interface 258 that is connected or connectable to, or in communication or exchange with, the data interface 158 of the device 100. Alternatively or additionally, the printer 200 comprises a material interface 256 that is connected or connectable to, or in communication or exchange with, the material interface 156 of the device 100.

For example, the material interfaces 156 and 256 are in connection, or can exchange, the printed product 214. The data interfaces 158 and 258 are in communication or connection for exchanging measurement data from the respective sensors 104, 106, and/or 212 and/or control commands from the control unit 130 of the device and/or from a control unit 230 of the printer 200.

Optionally, as shown by way of example in FIG. 1, the printer 200 comprises an interface 222 to a computer or computer network 300 (for example, a connection to the Internet). The printer 200 (for example, its controller or control unit 230) may receive print jobs via the interface 222.

The device 100 for applying the marking 101 to the conductor 102 is also referred to as an applicator.

An embodiment of the applicator 100 (for example, the aforementioned first embodiment of the applicator 100) or a system comprising an embodiment of the applicator 100 and an embodiment of the printer 200 (for example, the aforementioned embodiment of the printer) are configured to perform one or more of the following functions and method steps.

The applicator 100 and the printer 200 may perform operations (which are also referred to as actions), i.e., a set of one or plurality of process steps, alternately, in particular when applying the marking 101 to the conductor 102. In doing so, the applicator 100 and the printer 200 communicate with each other via the data interfaces 158 and 258, respectively, for example, in order to coordinate parameters and/or timing of the operations (preferably of the next operation in each case). The alternating execution of the operations is also referred to as interleaved operation of the applicator 100 and the printer 200.

In a first implementation, an overall procedure control (or sequence control) is stored (e.g., implemented or executably stored) in the printer 200, for example, in the control unit 230 (preferably by means of firmware stored in the control unit 230). The overall procedure control may comprise printing on the print medium 208 and applying the printed product 214 resulting from the printing.

A procedure control (or sequence control) of the applicator 100 may be stored (e.g., implemented or executably stored) in the applicator 100 and/or the printer 200. The procedure control of the applicator 100 may comprise (preferably exclusively) applying the marking 101 to the conductor 102 using the printed product 214. For example, the marking 101 is applied to the conductor 102 by executing the procedure control of the applicator 100.

In other words, executing the procedure control of the applicator 100 may be partially or entirely in the applicator 100 or exclusively executed in the printer 200. In any case, executing the procedure control of the applicator 100 causes the marking 101 to be applied to the conductor by means of the applicator 100.

In a first variant of the first implementation, the procedure control (e.g., sequence control) of the applicator 100 is stored in the printer 200. The applicator 100 preferably does not have any sequence control, for example, it also does not have a control unit 130. The control unit 230 of the printer (for example, the firmware of the printer 200 in the control unit 230) is configured to (preferably individually) control (or drive) the actuators (for example 120 and/or 122) or (preferably individually) query (or detect) the sensors (for example, 104 and/or 106) of the applicator 100 via the data interfaces 158 and 258.

In a second variation of the first implementation, the procedure control (e.g., sequence control) of the applicator 100 is stored (e.g., implemented or executably stored) in the applicator 100. For example, the applicator 100 comprises the control unit 130 or the regulating unit 130 in which the sequence control of the applicator 100 is stored (e.g., implemented or executably stored). Preferably, the control unit 130 or the regulating unit 130 is configured to control or regulate the applicator. For simplicity and without limitation, reference is made herein to the control unit 130, i.e., the function of a regulator (e.g., closed-loop control) is optionally comprised.

The execution of the procedure control (or sequence control) (preferably in the control unit 130) is started by the printer 200 (for example, the control unit 230, preferably by means of the printer firmware). For this purpose, the applicator 100 may receive a control command via the data interface 158 or may be energized via the electrical interface 154. As soon as an operation of the applicator 100 is required, the printer 200 (for example, the control unit 230, preferably by means of the printer firmware) sends a signal as a control command to the applicator 100 via the data interface 258 or 158.

Preferably, the printer 200 waits while the applicator 100 performs the requested operation (for example, initiated by the control command). As soon as the applicator 100 sends (e.g., reports) a signal via the data interface 158 or 258 as a control command of completion of the operation, the printer 200 continues execution of the overall procedure control.

Optionally, the signal from the applicator 100 to the printer 200 indicates a status of completion of the operation. For example, the status may indicate successful completion or an error that occurred during execution of the operation.

In a second implementation, the applicator 100, for example the control unit 130 (preferably using firmware of the applicator 100) executes the overall procedure control (i.e., the overall operation). In other words, the overall procedure control is stored (e.g., implemented or executably stored) in the applicator 100, for example, in the control unit 130 (preferably by means of firmware stored in the control unit 130). By executing the overall procedure control, the applicator 100 controls the overall flow.

The printer 200 acts as a slave in the overall operation. For example, the printer 200 has sovereignty over the printed image, i.e., the printer 200 (preferably its control unit 230) performs the printing as an operation of the printer 200 in response to a corresponding control command from the applicator 100. Optionally, the printer 200 issues a control command (i.e., a first start command) to execute the overall procedure control, for example, because only the printer 200 knows about the content and/or the presence of a print job.

To implement the interleaved (or alternating or nested) operation, the applicator 100 and the printer 200 exchange information (for example, measurement data and/or control commands) using the data interface 158 and 258, respectively.

The exchanged information may comprise measured values (for example, electrical voltages, electrical currents, electrical frequencies), preferably measured values of the sensor 104 and/or 106, which are transferred (i.e., sent) from the applicator 100 to the printer 200. Alternatively or additionally, measured values of a sensor of the printer (for example, the photoelectric sensor 212) may be transferred (i.e., sent) from the printer 200 to the applicator 100. The applicator 100 or the printer 200 may determine (for example, calculate) sequence control parameters based on the measured values and/or transmit the measured values or the parameters to the computer or computer network 300 (for example, to application software) via the interface 222.

For example, the sensor 106 may detect a diameter or circumference of the conductor 102 (or the prolate object about its longitudinal axis). The control unit 130 and/or the control unit 230 may determine a length of a feed of the print medium 208 and/or a selection of the print medium 208, for example, based on the detected diameter or circumference.

Furthermore, when a defined threshold value is exceeded, these measured values may be transferred as a digital signal (for example, either as a state "0" or a state "1") to the data interface 158 or 258, respectively, in order to indicate to the other (printer 200 or applicator 100, respectively) that a defined state (for example, the completion of an operation). For example, reaching an end position or a reference point of an actuator (for example, the actuator 120 and/or 122) may be indicated.

A reference move (or reference run) of an actuator of the applicator 100 (for example, the actuator 120 and/or 122) may be used to mechanically move an actuator (i.e., a drive connected to a mechanism of the applicator 100) to a determined position of the actuator (i.e., the mechanism), referred to as a reference position. A control command from the printer 200 or a process step of the operation, sequence control, and/or overall sequence control performed by the applicator 100 may comprise a motion (for example, a travel command) of the actuator, with the reference position serving as a reference point for the motions.

When the control unit 130 of the applicator 100 (for example, the applicator firmware) calculates one or more parameters of the applying (i.e., procedure control) from measured values (for example, transferred from the printer 200 or acquired from the sensor 104 and/or 106), the parameter(s) may be transferred to the control unit 230 of the printer 200 (preferably to the printer firmware thereof) in accordance with a communication protocol via the data interface 158 and 258. Furthermore, the control unit 130 of the applicator 100 (preferably its applicator firmware) may also use measurement data acquired by the printer 200 (for example, measurement data from the light barrier 212) to control the sequence control of the applicator (for example, as parameters of the applicator).

The printer 200 may be configured to print normal labels, for example, when no device 100 is attached to the mechanical interface 152 and/or the data interface 158.

The printer 200 may be a thermal transfer printer. The thermal transfer printer may provide high contrast and consistent marking 101. For example, the printer 200 may be a thermal transfer roll printer.

The embodiment of the printer 200 comprises an unroller 216 (or source roller) of the print media 208 disposed upstream of the print head 202, an unroller 218 of the print media 206 disposed upstream of the print head 202, and a rewinder 220 (or target roller) of the print media 206 disposed downstream of the print head 202.

An electrical interface 254 of the printer 200 is configured to supply electrical power to the applicator 100 attached to the printer via the electrical interface 154 thereof.

Optionally, the printer comprises a display 209, preferably user interface with a touch-sensitive screen. The control unit 230 and/or regulating unit 230 of the printer 200 may be in signal communication with the display 209, for example, to display a message or to select or enable a print job.

Figure 2:
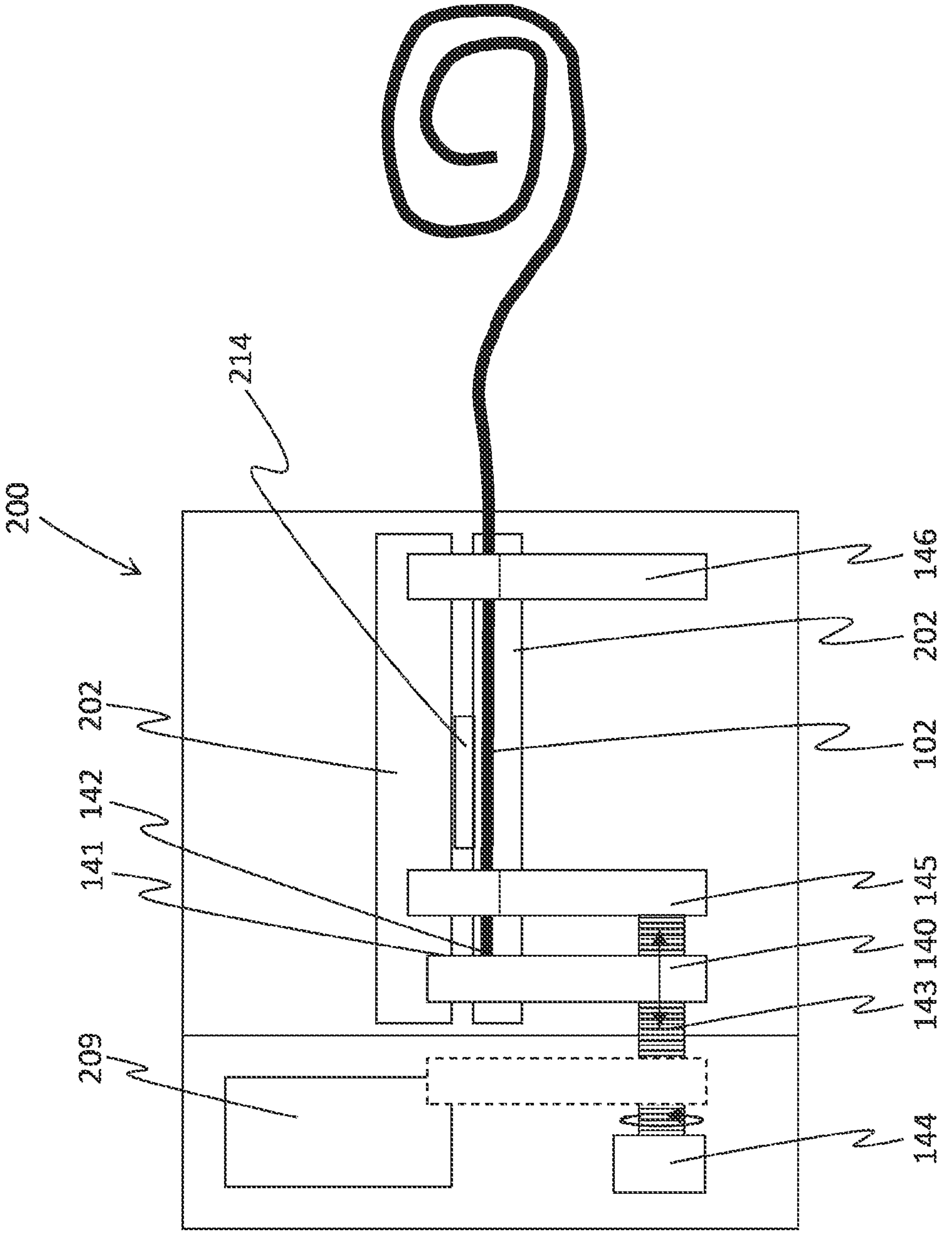
FIG. 2 a schematic front view of a first embodiment of a stop that may be usable in any embodiment of the device for arranging a marking.

FIG. 2 shows a schematic front view of a first embodiment of a stop generally designated by reference numeral 140, which may be applicable in any embodiment of the device, for example, in the device aspect described at the beginning or in any of the embodiments of the device 100. For clarity, only features 140 to 146 of the device 100 are shown, also because the first embodiment for implementing a stop 140 is not limited to a particular embodiment of the device 100.

Features of the printer 200 are shown in FIG. 2 to illustrate an exemplary relative arrangement, for example, in the mounted state of the device 100.

The distance of the end 142 of the object 102 to be marked (for example, a conductor) from the marking 101 using the printed product 214 (for example, a label or tube) provided (or output) from the printer 200 is adjustable. For this purpose, there is a stop 140 having a stop surface 141 that is displaceable relative to at least one object holder 145 and/or 146 of the object 102 (for example, a fixture of the object 102 to be marked).

The shifting of the position of the stop 140 may be realized by a threaded rod 143 or a spindle 143 driven by an electric motor. In the latter case, the spindle 143 is driven by an actuator 144 which is preferably controlled or regulated by the control unit 130 or regulating unit 130 of the device 100 or (for example, via the data interface 158) by the control unit 230 or regulating unit 230 of the printer 200.

In a variant that may be realizable in any embodiment, the at least one object holder 145 and/or 146 is immovable with respect to the device 100, preferably with respect to the location of arranging the marking 101.

In the second variant, which may be realizable in any embodiment and may also be combinable with the first variant with respect to different object holders, an object holder 145, is firmly connected to the stop 140. As a result, the object 102 may be positioned on the stop surface 141 not only along its longitudinal axis, but also transversely to the longitudinal axis. Alternatively or additionally, the end 142 of the conductor may be fixed to the stop 140 in a tension-proof manner. This may allow the object 102 to be retracted when the position of the stop 140 is adjusted (for example, manually or by electric motor and/or control).

Preferably, the object 102 is longitudinally movable along the longitudinal axis and is received in an object holder 146 that is along the longitudinal axis on the opposite side of the location of arranging the marking 101 from the stop 140.

In the case of a conductor as object 102, its longitudinal axis is the direction of conduction.

Figure 3:
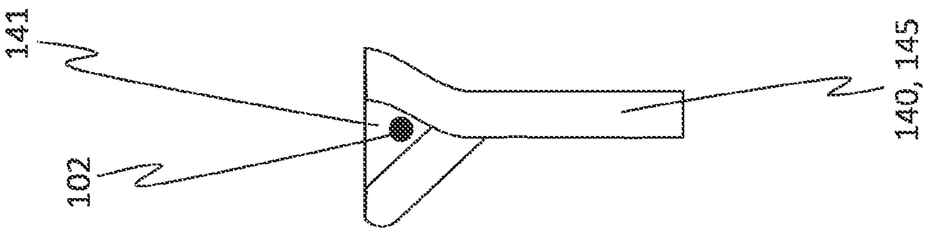
FIG. 3 a schematic side view of a second embodiment of a stop that may be usable in any embodiment of the device for arranging a marking.

FIG. 3 shows a schematic side view of a second embodiment of the stop 140, which may be used in any embodiment of the device for arranging a marking. In the second embodiment, at least one object holder 145 is fixedly arranged, preferably integrally formed, on the stop 140.

In any embodiment of the stop 140, the at least one object holder 145 and/or 146 may comprise at least two upwardly extending fork arms between which the object 102 may be longitudinally movable along its longitudinal axis.

Figure 4:
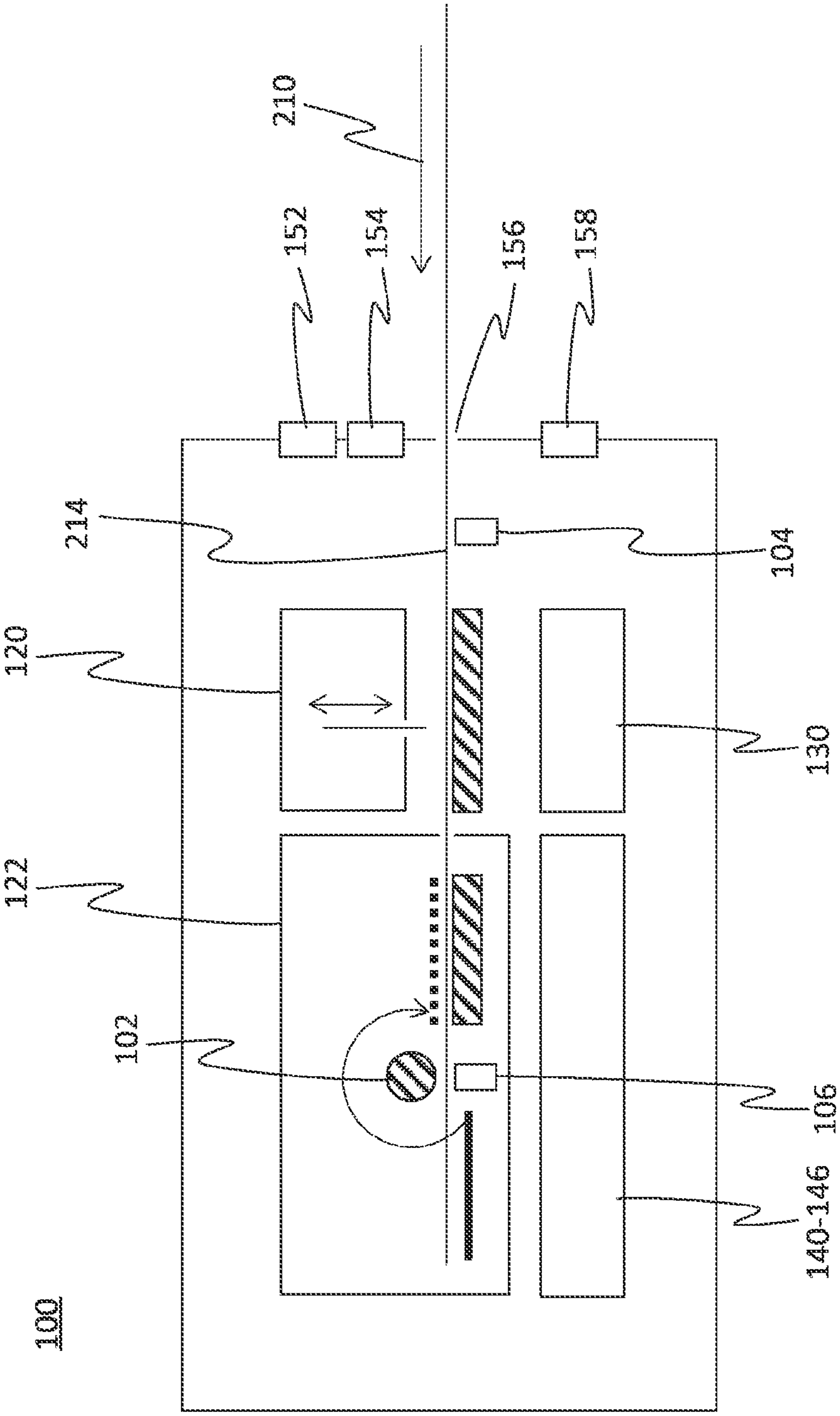
FIG. 4 a schematic sectional view of a second embodiment of the device for providing marking in a first state.
Figure 5A:
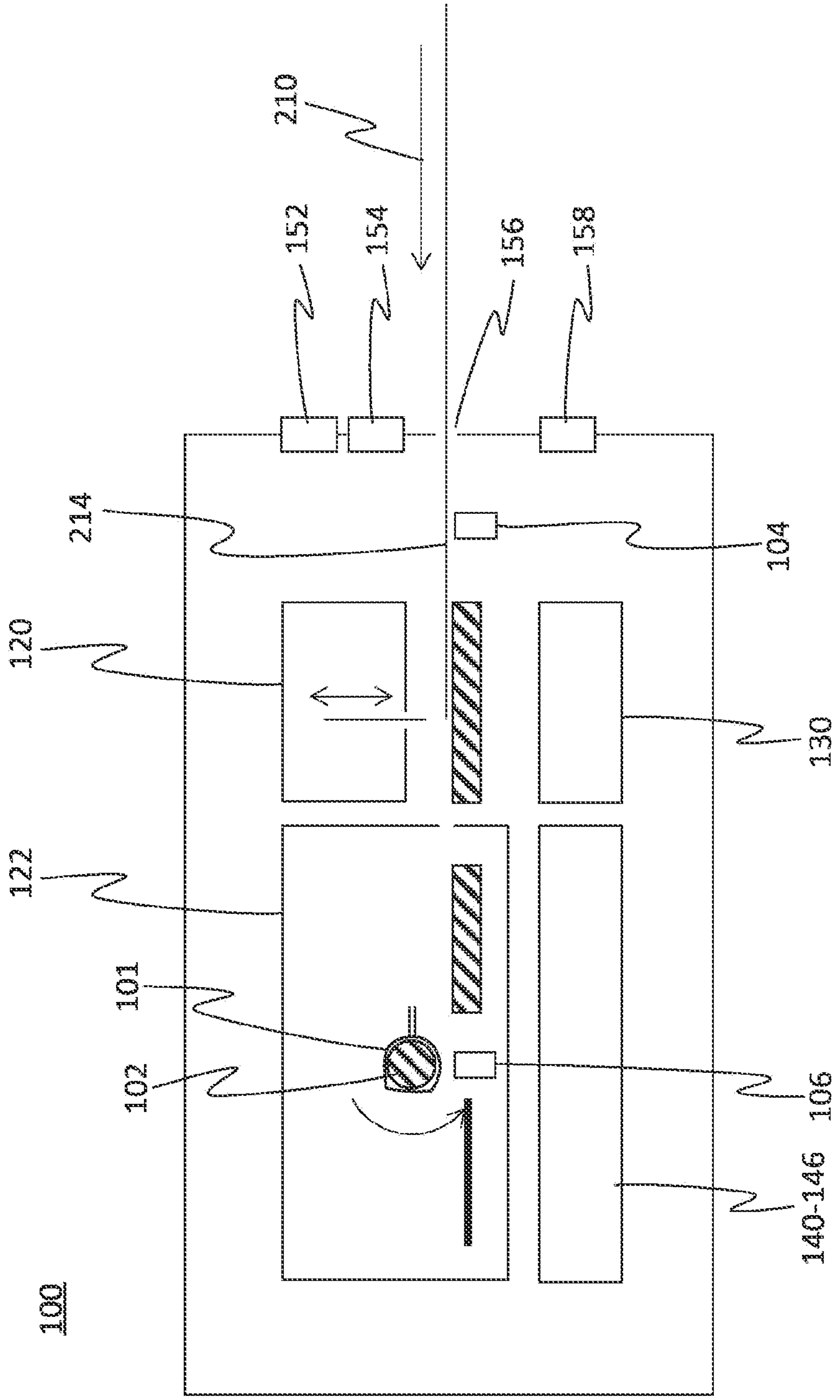
FIG. 5A a schematic sectional view of a second embodiment of the device for providing marking in a second state.

FIGS. 4 and 5A show a schematic cross-sectional view of a second embodiment of the applicator 100 (i.e., the device 100 for applying) a printed marking in a first state and a second state of application, respectively.

The second embodiment of the applicator 100 may be implemented independently or in further variant of the first embodiment of the applicator 100. Features of the first and second embodiments of the applicator 100, denoted by the same reference numerals, may be the same or interchangeable.

The second embodiment of the applicator 100 is configured to strike or fold a printed film as a printed product 214 around the conductor 102 by means of a second actuator 122 of the applicator 100. Preferably, the sensor 106 determines the diameter of the conductor 102. The control unit 130 calculates a length from the diameter and controls the printer (more specifically, its printing roller 204) via the data interface 158 to feed the printed product 214 according to the determined length.

After the feed, for example in the first state shown in FIG. 1, the printer 200 signals via the data interface 258 (i.e., to the data interface 158) that the feed has been successfully completed, for example that the determined length has been reached. In response to the message from the printer 200, the control unit 130 controls the actuator 122 to wrap or fold the printed product 214 around the conductor 102. Further, the second actuator 122 (or, in one variant, a further actuator) is configured to heat weld together sections of the printed product 214 that lie flat on top of each other. Preferably, a first actuator 120 of the applicator cuts the welded sections to a flush end of the marking 101.

In a first variant of the second embodiment of the applicator 100, a portion of the surface surrounding the conductor 102 is printed and the flush cut end is short compared to the circumference of the conductor 102. Preferably, the applying, i.e., a step of the procedure control of the applicator 100, comprises two embossments performed on the printed product before and after the printed portion using the actuator 120, as schematically shown in FIG. 5A.

For example, the procedure control of the applicator 100 may comprise at least one of the following operations or steps. In one step, a control command is sent from the control unit 130 to the printer 200. The control command specifies the feed rate of the printed product 214 for a reference cut. In another step, in response to a notification of completion of the feed from the printer 200 to the applicator 100, the reference cut is executed by the actuator 120. A further step of the procedure control of the applicator 100 may comprise waiting until the presence of the conductor 102 is detected or acquired by means of the sensor 106. Another step of the procedure control (i.e., the procedure control sequence) of the applicator 100 may comprise acquiring the diameter of the conductor 102 by means of the sensor 106 and calculating parameters of the applying (for example, partial lengths for feeds of the printed product 214).

In a further step, a further control command is sent from the control unit 130 to the printer 200. The further control command indicates a first partial feed of the printed product 214 for a first embossing. In a further step, in response to a notification of completion of the first partial feed from the printer 200 to the applicator 100, the first embossing is performed by the actuator 120.

In a further step, a further control command is sent from the control unit 130 to the printer 200. The further control command specifies a second partial feed of the printed product 214 for a second embossing. In a further step, in response to a notification of completion of the second partial feed from the printer 200 to the applicator 100, the second embossing is performed by the actuator 120.

In a further step, a control command is sent from the control unit 130 to the printer 200 indicating a partial feed of the printed product 214 for a cutting position. In a further step, in response to a notification of completion of the partial feed for the cutting position from the printer 200 to the applicator 100, the cut is performed by the actuator 122, the printed product is wrapped or folded around the conductor 102, sealing portions of the printed product 214 brought into contact with each other in a planar manner, and a cut performed by the actuator 120.

Figure 5B:
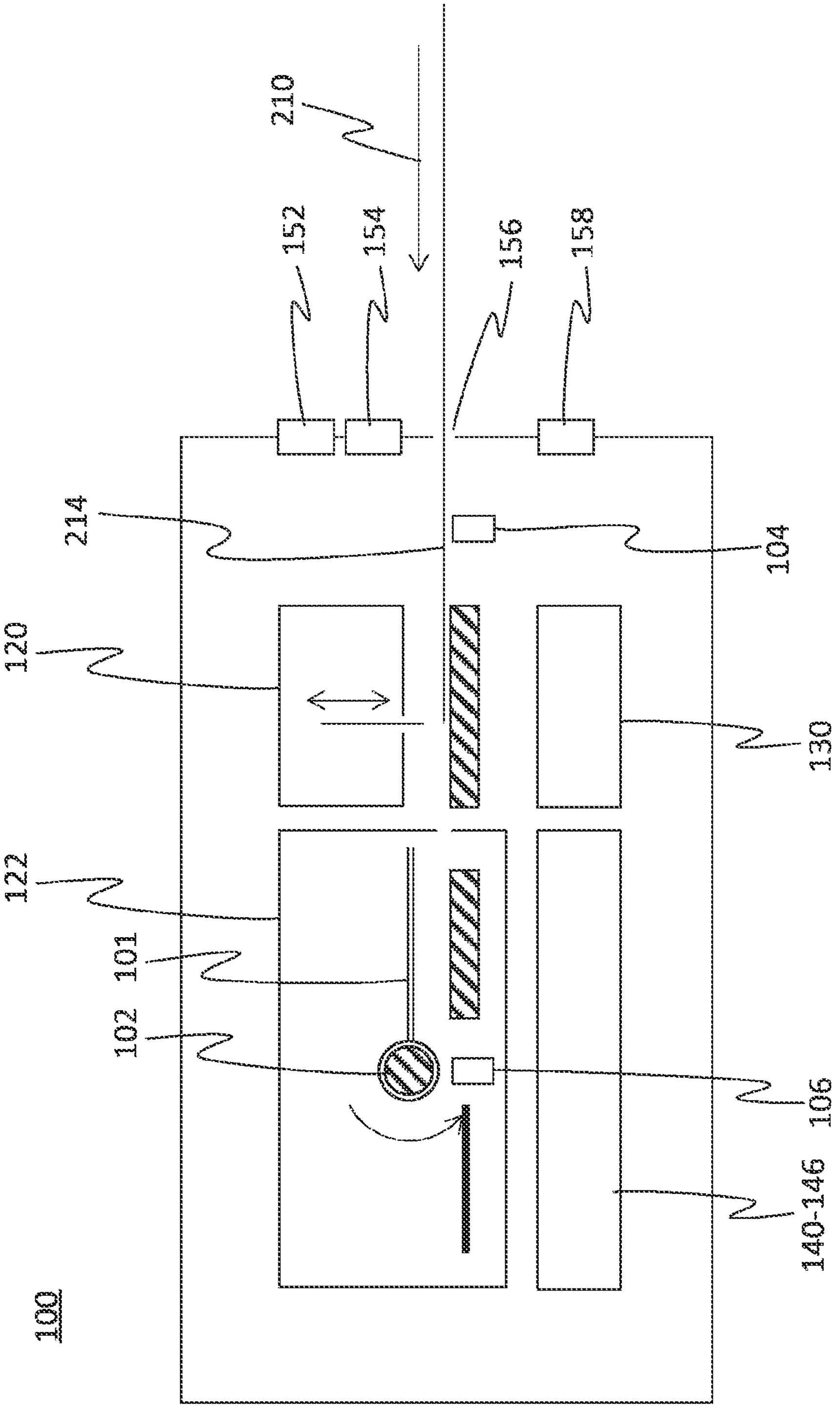
FIG. 5B a schematic sectional view of a variant of the second embodiment of the device for providing marking in a second state.

In a second variant of the second embodiment of the applicator 100, the flush cut end is equal to or longer than the diameter of the conductor 102 and comprises the printed portion of the printed product 214, as schematically shown in FIG. 5B.

Figure 6:
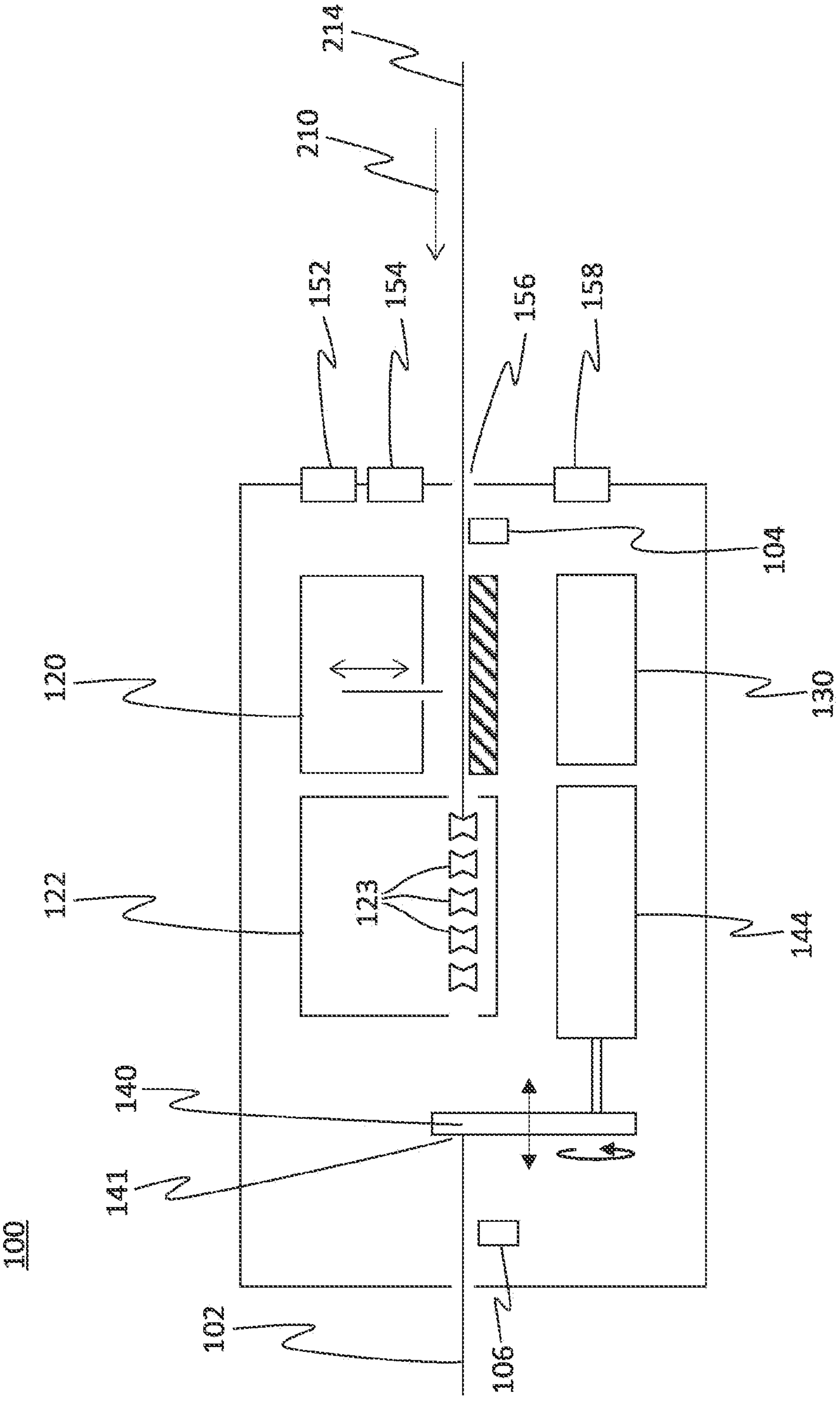
FIG. 6 a schematic sectional view of a third embodiment of a device for providing a marking in a first state.
Figure 7:
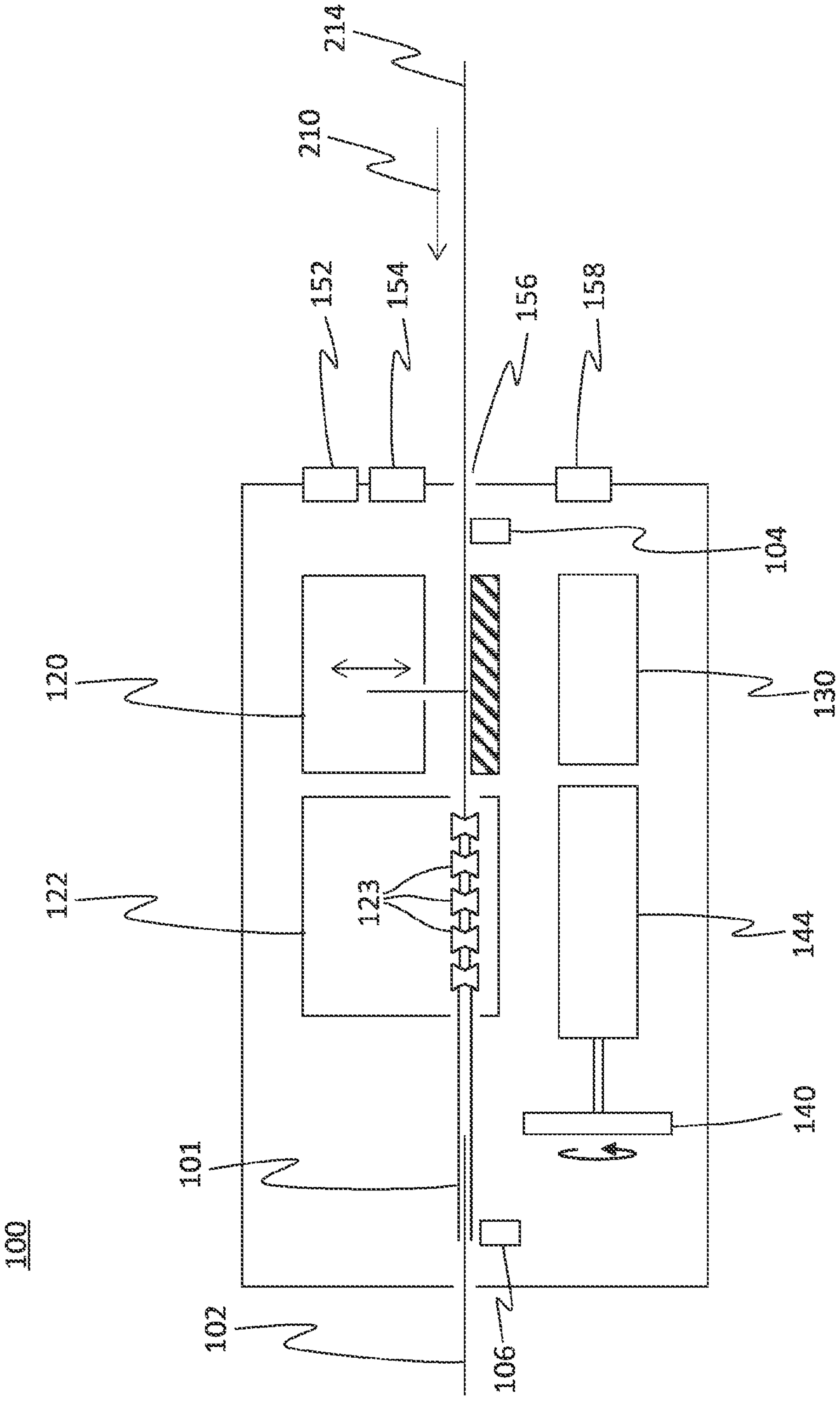
FIG. 7 a schematic sectional view of a third embodiment of a device for providing a marking in a second state.

FIGS. 6 and 7 show a schematic cross-sectional view of a third embodiment of the applicator 100 (i.e., the device 100 for applying) a printed marking in a first state and a second state of application, respectively.

The third embodiment of the applicator 100 may be implemented independently or in further embodiment of the first and/or second embodiment of the applicator 100. Features of the first, second, and third embodiments of the applicator 100 designated by the same reference numerals may be identical or interchangeable.

The third embodiment of the applicator 100 is configured to slide or attach a tube (for example, a heat-shrink tube) as a print medium 208 or a printed tube as a printed product 214.

Therefore, the longitudinal axis of the conductor 102 is parallel or substantially parallel to the longitudinal direction 210 of the provided (or output) printed product 214.

To allow the marking to be arranged by sliding it on, the stop 140 is mounted for pivotal motion about a pivot axis between a first pivot position and a second pivot position. In the first pivot position, the stop 140 limits the longitudinal motion of the prolate object 102 along the longitudinal axis. This state is shown schematically and by way of example in FIG. 6. In the second pivot position, the stop 140 is arranged outside the longitudinal axis to allow the at least one actuator 120 and/or 122 access to the end of the conductor 102. This state is shown schematically and by way of example in FIG. 7.

The pivot axis may be driven by an actuator (for example, the same actuator 144 that performs the adjustable positioning of the stop 140 or another actuator). Preferably, the pivot axis is parallel to the longitudinal axis and not coaxial or aligned with the axis of rotation of the spindle 143 for adjustable positioning of the stop 140.

When the tube is printed and/or cut (for example using the first actuator 120 of the applicator), the tube is pressed flat, whereby its cut end or at least a section of the printed tube may be closed, i.e. the cut edge or the inner sides of the tube adhere to each other.

The second actuator 122 (also: opening unit) is configured to open the adhered cut edge of the printed tube and/or the adhered inner sides (for example, an upper half of the tube and a lower half of the tube) of the printed tube. To this end, the second actuator 122 comprises waisted rollers 123 that apply a force in pairs to opposite lateral edges of the printed tube 214 to open the cut edge of the tube and/or to release the inner sides of the tube from each other. In the schematic illustration of FIGS. 6 and 7, one of each of the pairs of oppositely disposed rollers 123 is visible as the pairs are aligned perpendicular to the longitudinal direction 210 or the direction 210 of motion.

In the second state shown in FIG. 7, the printed tube is opened using the second actuator 122, pushed onto the conductor as a marking 101 due to a feed from the printer 200, and cut off at the end using the first actuator 120.

Figure 8:
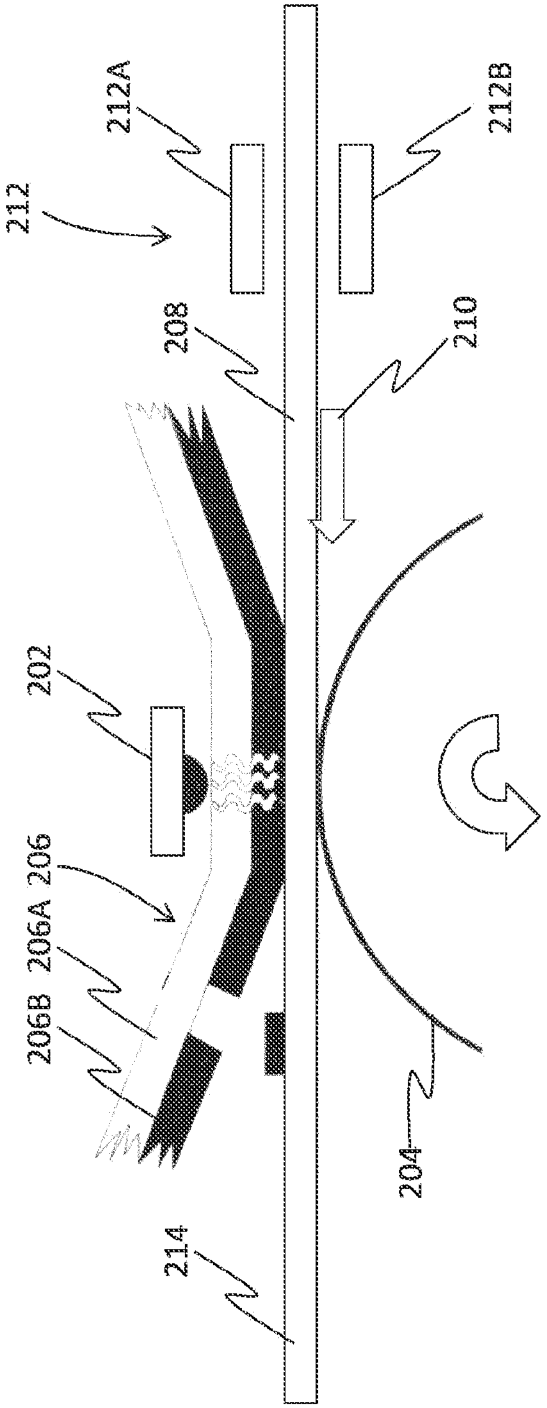
FIG. 8 a schematic sectional view of an embodiment of a printer as a thermal transfer printer.

FIG. 8 shows a further embodiment of the printer 200, which may be implemented independently or as a further development of the embodiment of the printer 200 described in the context of FIG. 1. Features of the embodiments designated by the same reference numerals may be identical or interchangeable. The further embodiment of the printer 200 is an example of a thermal transfer roll printer.

A control unit 230 of the printer 200 controls a feed and/or a retraction of the print medium 208 at the print head 202 and/or of the printed product 214 at the material interface 256 (and consequently at the material interface 156 of the device 100) depending on the signals of the light barrier 212 and/or control commands obtained from the device 100 via the data interface 258 (i.e., via the data interface 158 of the device 100). For this purpose, the control unit 230 may control a drive (for example, a stepper motor) for rotating the print roller 204.

The light barrier 212 may be arranged upstream of the print head 202 and/or the platen roller 204, with respect to a direction 210 of motion of the print medium 208 during advancement. The light barrier 212 may comprise, as exemplarily shown in FIG. 8, a light source 212A on the side of the print head 202 and a light sensor 212B on the side of the print roller 204. In a first variation, the positions of light source 212A and light sensor 212B may be interchanged. In a second variation, light source 212A and light sensor 212B may be arranged on the same side for detecting the print medium 208 in reflection.

The print head 202 comprises a plurality of heating elements. When the heating elements are heated (for example, energized) and the print roller 204 applies a predetermined (for example, sufficiently large) pressure to the print medium 208, the color pigments are transferred from the print material 206 (for example, a color ribbon) to the material to be printed. The control unit 230 may control the stepper motor to rotate the print roller 204 and control the energization of the heating elements of the print head 202.

The printing material 206 may comprise a plurality of layers. For example, the printing material 206 may comprise a carrier material 206A (for example, a carrier film) facing away from the print medium 208 and a color layer 206B (for example, a color wax) facing toward the print medium 208.

The printer 200 is preferably a tabletop device to which the device 100 may be attached as a replaceable or interchangeable module, for example, specific to an application or for the duration of a uniform application process.

Figure 9A:
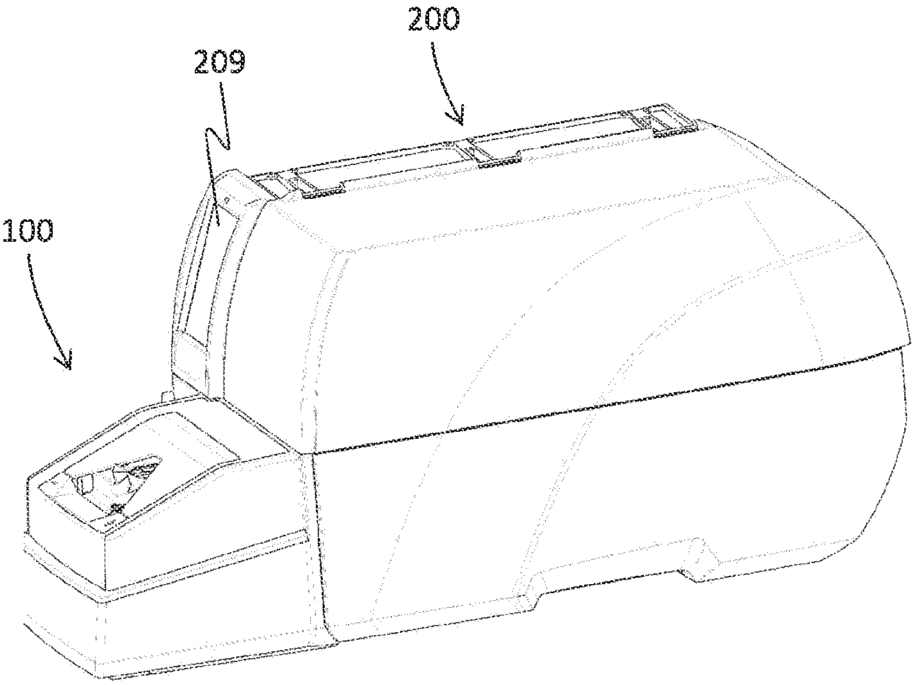
FIG. 9A a schematic perspective view of an exemplary printing system comprising an embodiment of the printer and an embodiment of the device for providing a marking, in an attached or mounted position.
Figure 9B:
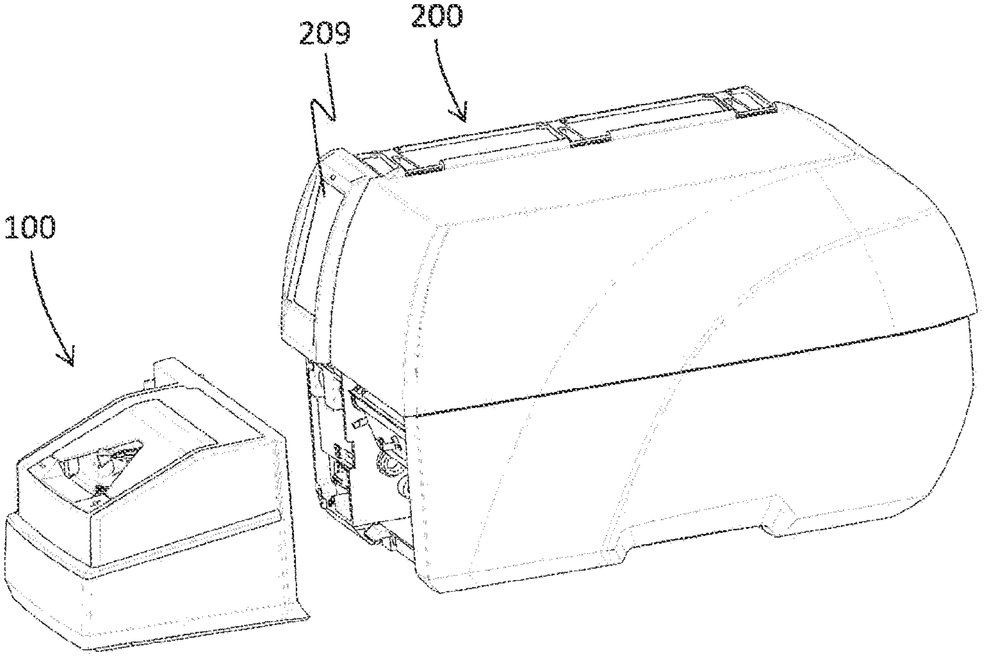
FIG. 9B a schematic perspective view of the exemplary printing system of FIG. 9A in a detached or disassembled position.

FIG. 9A shows a schematic perspective view of an exemplary printing system (system for short), comprising an embodiment of the printer 200 and an embodiment of the device 100. In an exemplary mounted position of the device shown in FIG. 9A, all implemented physical interfaces are connected due to the arrangement of the device 100 on the printer 200. FIG. 9B shows a schematic perspective view of the exemplary printing system of FIG. 9A in a disassembled position. The physical interfaces are exposed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Device for providing a marking, for example applicator 100
Marking (or label) 101
Prolate object, preferably conductor, for example copper conductors or optical fibers 102
Printing signal interface of a control signal as to providing the printed product, for example a sensor to detect the printed product 104
Sensor of a control signal as to providing the marking, for example sensor to detect the object or pushbutton for detecting a provisioning request 106
First actuator of the device, for example cutting unit 120
Transverse direction 121
Second actuator of the device 122
Waisted rollers of the second actuator 123
Control unit or regulating unit of the device 130
Stop, for example adjustably positionable stop 140
Stop surface of the stop 141
End of the object, preferably end of the conductor 142
Threaded rod or spindle for adjustable positioning 143
Actuator for adjustable positioning of the stop 144
Object holder, preferably between marking location and stop 145
Object holder, preferably facing away from the stop 146
Mechanical interface of the device 152
Electrical interface of the device 154
Material interface of the device 156
Data interface of the device 158
Printer, for example thermal transfer printer 200
Printer print head 202
Printer print roller 204
Printing material, for example color ribbon 206
Carrier material of the printing material, for example carrier foil 206A
Color layer of the printing material, for example color wax 206B
Print medium of the printer (also: printing material) 208
Display, preferably user interface, of the printer 209
Feeding direction or longitudinal direction of the print medium 210
Printer light barrier 212
Light barrier light source 212A
Light barrier light sensor 212B
Printer printed product 214
Unwinder of the print medium 216
Unwinder of the printing material 218
Rewinder of the printing material 220
Data interface of the printer 222
Printer control unit 230
Mechanical interface of the printer 252
Electrical interface of the printer 254
Material interface of the printer 256
Data interface of the printer 258
Computer or computer network 300

The invention claimed is:

1. A device for arranging a marking around a prolate object, comprising:
- a material interface configured to receive a printed product provided by a printer;
- a printing signal interface configured to acquire a control signal indicative of the provision of the printed product;
- a stop configured to limit a longitudinal motion of the prolate object along a longitudinal axis in an end position of the prolate object relative to the device; and
- at least one actuator configured to, depending on the control signal indicative of the provision of the printed product, arrange the marking in a circumferentially closed manner on the prolate object using the printed product provided by the printer,
- wherein the prolate object is arrangeable in the end position,
- wherein the stop is mounted for pivotal motion about a pivot axis between a first pivot position and a second pivot position, and
- wherein the stop is configured to limit a longitudinal motion of the prolate object along the longitudinal axis in the first pivot position and is arranged outside the longitudinal axis in the second pivot position.

2. The device of claim 1, wherein an end of the prolate object abuts the stop prior to the arranging of the marking and/or during the arranging of the marking.

3. The device of claim 1, wherein the stop is adjustably positioned along the longitudinal axis and the adjustable position of the stop determines a distance between an end of the object abutting the stop and the marking arranged on the object.

4. The device of claim 3, wherein the position of the stop is manually adjustable by a threaded rod parallel to the longitudinal axis.

5. The device of claim 3, wherein the position of the stop is adjustable by a spindle parallel to the longitudinal axis, which is in driving connection with the at least one actuator or a further actuator of the device.

6. The device of claim 1, wherein the material interface is configured to receive the printed product provided by the printer in a longitudinal direction, and
- wherein the longitudinal axis is parallel or perpendicular to the longitudinal direction of the printed product.

7. The device of claim 3, wherein the position of the stop is adjustable by a spindle parallel to the longitudinal axis, which is in driving connection with a further actuator of the device,
- wherein the device further comprises a control unit or a regulating unit configured to control or regulate the at least one actuator of the device for the arranging of the marking, and to control or regulate the further actuator for the pivotal motion of the stop, and
- wherein the stop is in the first pivot position prior to the arranging of the marking and is in the second pivot position during the arrangement.

8. The device of claim 1, further comprising:
- at least one object holder configured to receive and/or support the object longitudinally movable along the longitudinal axis relative to the device.

9. The device of claim 8, wherein the at least one object holder defines the end position transverse to the longitudinal axis.

10. The device of claim 8, wherein the at least one object holder comprises an object holder along the longitudinal axis on either side of a location of the arranging of the marking.

11. The device of claim 8, wherein one object holder of the at least one object holder is arranged along the longitudinal axis between the stop and the location of the arranging of the marking.

12. The device of claim 8, wherein the stop comprises an object holder of the at least one object holder, and/or wherein an object holder of the at least one object holder is rigidly connected to the stop.

13. The device of claim 8, wherein the at least one object holder or each object holder of the at least one object holder comprises:

a fork having two upwardly diverging fork arms configured to receive the object between the fork arms with the longitudinal axis of the object transverse to a plane spanned by the fork arms.

14. The device of claim 8, wherein the stop and/or the at least one object holder comprises at least one sensor configured to acquire a control signal indicative of the arranging of the marking.

15. A system for arranging a marking around a prolate object, comprising:

a printer configured to provide a printed product; and the device of claim 1, wherein the material interface is arranged, relative to the printer, to receive the printed product provided by the printer.

16. The device of claim 1, wherein the prolate object comprises a conductor.

17. The device of claim 1, wherein the end position is relative to a location of the arranging of the marking.

18. The device of claim 2, wherein the end of the prolate object abuts a stop surface of the stop prior to the arranging of the marking and/or during the arranging of the marking.

19. A device for arranging a marking around a prolate object, comprising:

a material interface configured to receive a printed product provided by a printer;

a printing signal interface configured to acquire a control signal indicative of the provision of the printed product;

a stop configured to limit a longitudinal motion of the prolate object along a longitudinal axis in an end position of the prolate object relative to the device; and at least one actuator configured to, depending on the control signal indicative of the provision of the printed product, arrange the marking in a circumferentially closed manner on the prolate object using the printed product provided by the printer, wherein the prolate object is arrangeable in the end position, wherein the stop is adjustably positioned along the longitudinal axis and the adjustable position of the stop determines a distance between an end of the object abutting the stop and the marking arranged on the object, wherein the position of the stop is adjustable by a spindle parallel to the longitudinal axis, which is in driving connection with the at least one actuator or a further actuator of the device, wherein the stop is mounted for pivotal motion about a pivot axis between a first pivot position and a second pivot position, wherein the stop is configured to limit a longitudinal motion of the prolate object along the longitudinal axis in the first pivot position and is arranged outside the longitudinal axis in the second pivot position, wherein the device further comprises a control unit or a regulating unit configured to control or regulate the at least one actuator of the device for the arranging of the marking, and to control or regulate the further actuator for the pivotal motion of the stop, and wherein the stop is in the first pivot position prior to the arranging of the marking and is in the second pivot position during the arrangement.

* * * * *